United States Patent
Gass

(10) Patent No.: US 7,359,174 B2
(45) Date of Patent: Apr. 15, 2008

(54) MOTION DETECTING SYSTEM FOR USE IN A SAFETY SYSTEM FOR POWER EQUIPMENT

(75) Inventor: Stephen F. Gass, Wilsonville, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 11/506,260

(22) Filed: Aug. 18, 2006

(65) Prior Publication Data

US 2006/0272463 A1 Dec. 7, 2006

Related U.S. Application Data

(63) Continuation of application No. 10/923,282, filed on Aug. 20, 2004, now abandoned, and a continuation of application No. 09/929,234, filed on Aug. 13, 2001, now Pat. No. 7,225,712.

(60) Provisional application No. 60/496,568, filed on Aug. 20, 2003, provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*H01H 47/00* (2006.01)

(52) U.S. Cl. ...................................................... 361/143

(58) Field of Classification Search .................... 83/58, 83/477.2; 361/143
See application file for complete search history.

(56) References Cited

U.S. PATENT DOCUMENTS 146,886 A 1/1874 Doane et al.

(Continued)

FOREIGN PATENT DOCUMENTS

CA 2140991 1/1995

(Continued)

OTHER PUBLICATIONS

Authors: Adel S. Sedra and Kenneth C. Smith, Title: Microelectronic Circuits, Date, Publisher & Edition: 1998, OxfordUniversity press, Fouth Edition.*

(Continued)

*Primary Examiner*—Lincoln Donovan
*Assistant Examiner*—Antony Paul

(57) ABSTRACT

A woodworking machine including a detection system adapted to detect a dangerous condition between a person and a working portion of the machine is disclosed. The machine includes a reaction system associated with the detection system to cause a predetermined action to take place relative to the working portion upon detection of the dangerous condition. A motion detection system is adapted to detect motion of the working portion and to disable the reaction system when the working portion is not moving. The motion detection system may sense whether motion in a machine has stopped by monitoring the back emf produced on the motor leads as the motor coasts to a stop. The woodworking machine may take the form of a saw, the working portion may be a blade adapted to cut when spinning, and the dangerous condition may be a person contacting the blade.

19 Claims, 3 Drawing Sheets

U.S. PATENT DOCUMENTS

| | | |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 2/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |

| | | | | | |
|---|---|---|---|---|---|
| 2,991,593 A | 7/1961 | Cohen | 3,905,263 A | 9/1975 | Smith |
| 3,005,477 A | 10/1961 | Sherwen | 3,922,785 A | 12/1975 | Fushiya |
| 3,011,529 A | 12/1961 | Copp | 3,924,688 A | 12/1975 | Cooper et al. |
| 3,011,610 A | 12/1961 | Stiebel et al. | 3,931,727 A | 1/1976 | Luenser |
| 3,013,592 A | 12/1961 | Ambrosio et al. | 3,935,777 A | 2/1976 | Bassett |
| 3,021,881 A | 2/1962 | Edgemond, Jr. et al. | 3,945,286 A | 3/1976 | Smith |
| 3,035,995 A | 5/1962 | Seeley et al. | 3,946,631 A | 3/1976 | Malm |
| 3,047,116 A | 7/1962 | Stiebel et al. | 3,947,734 A | 3/1976 | Flyer |
| 3,085,602 A | 4/1963 | Gaskell | 3,949,636 A | 4/1976 | Ball et al. |
| 3,105,530 A | 10/1963 | Peterson | 3,953,770 A | 4/1976 | Hayashi |
| 3,129,731 A | 4/1964 | Tyrrell | 3,960,310 A | 6/1976 | Nussbaum |
| 3,163,732 A | 12/1964 | Abbott | 3,967,161 A | 6/1976 | Lichtblau |
| 3,184,001 A | 5/1965 | Reinsch et al. | 3,974,565 A | 8/1976 | Ellis |
| 3,186,256 A | 6/1965 | Reznick | 3,975,600 A | 8/1976 | Marston |
| 3,207,273 A | 9/1965 | Jurin | 3,978,624 A | 9/1976 | Merkel et al. |
| 3,213,731 A | 10/1965 | Renard | 3,994,192 A | 11/1976 | Faig |
| 3,224,474 A | 12/1965 | Bloom | 4,007,679 A | 2/1977 | Edwards |
| 3,232,326 A | 2/1966 | Speer et al. | 4,016,490 A | 4/1977 | Weckenmann et al. |
| 3,246,205 A | 4/1966 | Miller | 4,026,174 A | 5/1977 | Fierro |
| 3,249,134 A | 5/1966 | Vogl et al. | 4,026,177 A | 5/1977 | Lokey |
| 3,274,876 A | 9/1966 | Debus | 4,029,159 A | 6/1977 | Nymann |
| 3,276,497 A | 10/1966 | Heer | 4,047,156 A | 9/1977 | Atkins |
| 3,306,149 A | 2/1967 | John | 4,048,886 A * | 9/1977 | Zettler ................... 83/58 |
| 3,313,185 A | 4/1967 | Drake et al. | 4,060,160 A | 11/1977 | Lieber |
| 3,315,715 A | 4/1967 | Mytinger | 4,070,940 A | 1/1978 | McDaniel et al. |
| 3,323,814 A | 6/1967 | Phillips | 4,075,961 A | 2/1978 | Harris |
| 3,337,008 A | 8/1967 | Trachte | 4,077,161 A | 3/1978 | Wyle et al. |
| 3,356,111 A | 12/1967 | Mitchell | 4,085,303 A | 4/1978 | McIntyre et al. |
| 3,368,596 A | 2/1968 | Comer | 4,090,345 A | 5/1978 | Harkness |
| 3,386,322 A | 6/1968 | Stone et al. | 4,091,698 A | 5/1978 | Obear et al. |
| 3,439,183 A | 4/1969 | Hurst, Jr. | 4,106,378 A | 8/1978 | Kaiser |
| 3,445,835 A | 5/1969 | Fudaley | 4,117,752 A * | 10/1978 | Yoneda ................... 83/58 |
| 3,454,286 A | 7/1969 | Anderson et al. | 4,145,940 A | 3/1979 | Woloveke et al. |
| 3,456,696 A | 7/1969 | Gregory et al. | 4,152,833 A | 5/1979 | Phillips |
| 3,512,440 A | 5/1970 | Frydmann | 4,161,649 A | 7/1979 | Klos et al. |
| 3,538,964 A | 11/1970 | Warrick et al. | 4,169,990 A * | 10/1979 | Lerdman ................ 318/138 |
| 3,540,338 A | 11/1970 | McEwan et al. | 4,175,452 A | 11/1979 | Idel |
| 3,554,067 A | 1/1971 | Scutella | 4,184,394 A | 1/1980 | Gjerde |
| 3,566,996 A | 3/1971 | Crossman | 4,190,000 A | 2/1980 | Shaull et al. |
| 3,580,376 A | 5/1971 | Loshbough | 4,195,722 A | 4/1980 | Anderson et al. |
| 3,581,784 A | 6/1971 | Warrick | 4,199,930 A | 4/1980 | Lebet et al. |
| 3,593,266 A | 7/1971 | Van Sickle | 4,206,666 A | 6/1980 | Ashton |
| 3,613,748 A | 10/1971 | De Pue | 4,206,910 A | 6/1980 | Biesemeyer |
| 3,621,894 A | 11/1971 | Niksich | 4,249,117 A | 2/1981 | Leukhardt et al. |
| 3,626,796 A * | 12/1971 | Pearl ................... 83/58 | 4,249,442 A | 2/1981 | Fittery |
| 3,670,788 A | 6/1972 | Pollak et al. | 4,262,278 A | 4/1981 | Howard et al. |
| 3,675,444 A | 7/1972 | Whipple | 4,267,914 A | 5/1981 | Saar |
| 3,680,609 A | 8/1972 | Menge | 4,270,427 A | 6/1981 | Colberg et al. |
| 3,688,815 A | 9/1972 | Ridenour | 4,276,459 A | 6/1981 | Willett et al. |
| 3,695,116 A | 10/1972 | Baur | 4,276,799 A | 7/1981 | Muehling |
| 3,696,844 A | 10/1972 | Bernatschek | 4,291,794 A | 9/1981 | Bauer |
| 3,716,113 A | 2/1973 | Kobayashi et al. | 4,305,442 A | 12/1981 | Currie |
| 3,719,103 A | 3/1973 | Streander | 4,319,146 A | 3/1982 | Wires, Sr. |
| 3,740,000 A | 6/1973 | Takada | 4,321,841 A | 3/1982 | Felix |
| 3,745,546 A | 7/1973 | Struger et al. | 4,334,450 A | 6/1982 | Benuzzi |
| 3,749,933 A | 7/1973 | Davidson | 4,372,202 A | 2/1983 | Cameron |
| 3,754,493 A | 8/1973 | Niehaus et al. | 4,374,552 A | 2/1983 | Dayen |
| 3,772,590 A | 11/1973 | Mikulecky et al. | 4,385,539 A | 5/1983 | Meyerhoefer et al. |
| 3,785,230 A * | 1/1974 | Lokey ................... 30/388 | 4,391,358 A | 7/1983 | Haeger |
| 3,793,915 A | 2/1974 | Huier | 4,418,597 A | 12/1983 | Krusemark et al. |
| 3,805,639 A | 4/1974 | Peter | 4,427,042 A | 1/1984 | Mitchell et al. |
| 3,805,658 A | 4/1974 | Scott et al. | 4,466,170 A | 8/1984 | Davis |
| 3,808,932 A | 5/1974 | Russell | 4,466,233 A | 8/1984 | Thesman |
| 3,829,850 A | 8/1974 | Guetersloh | 4,470,046 A | 9/1984 | Betsill |
| 3,829,970 A | 8/1974 | Anderson | 4,492,291 A | 1/1985 | Chometon et al. |
| 3,858,095 A | 12/1974 | Friemann et al. | 4,503,739 A | 3/1985 | Konieczka |
| 3,861,016 A | 1/1975 | Johnson et al. | 4,510,489 A | 4/1985 | Anderson, III et al. |
| 3,863,208 A | 1/1975 | Balban | 4,512,224 A | 4/1985 | Terauchi |
| 3,874,747 A | 4/1975 | Case et al. | 4,518,043 A | 5/1985 | Anderson et al. |
| 3,880,032 A | 4/1975 | Green | 4,532,501 A | 7/1985 | Hoffman |
| 3,882,744 A | 5/1975 | McCarroll | 4,532,844 A | 8/1985 | Chang et al. |
| 3,886,413 A | 5/1975 | Dow et al. | 4,557,168 A | 12/1985 | Tokiwa |
| 3,889,567 A | 6/1975 | Sato et al. | 4,559,858 A | 12/1985 | Laskowski et al. |

| Patent | Date | Name |
|---|---|---|
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,621,300 A | 11/1986 | Summerer |
| 4,625,604 A | 12/1986 | Handler et al. |
| 4,637,188 A | 1/1987 | Crothers |
| 4,637,289 A | 1/1987 | Ramsden |
| 4,644,832 A | 2/1987 | Smith |
| 4,653,189 A | 3/1987 | Andreasson |
| 4,657,428 A | 4/1987 | Wiley |
| 4,661,797 A | 4/1987 | Schmall |
| 4,672,500 A | 6/1987 | Tholome et al. |
| 4,675,664 A | 6/1987 | Cloutier et al. |
| 4,679,719 A | 7/1987 | Kramer |
| 4,718,229 A | 1/1988 | Riley |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,831,279 A | 5/1989 | Ingraham |
| 4,840,135 A | 6/1989 | Yamauchi |
| 4,845,476 A | 7/1989 | Rangeard et al. |
| 4,864,455 A | 9/1989 | Shimomura et al. |
| 4,875,398 A | 10/1989 | Taylor et al. |
| 4,888,869 A | 12/1989 | Leatherman |
| 4,896,607 A | 1/1990 | Hall et al. |
| 4,906,962 A | 3/1990 | Duimstra |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,962,685 A | 10/1990 | Hagstrom |
| 4,964,450 A | 10/1990 | Hughes et al. |
| 4,965,909 A | 10/1990 | McCullough et al. |
| 4,975,798 A | 12/1990 | Edwards et al. |
| 5,020,406 A | 6/1991 | Sasaki et al. |
| 5,025,175 A | 6/1991 | Dubois, III |
| 5,042,348 A | 8/1991 | Brundage et al. |
| 5,046,426 A | 9/1991 | Julien et al. |
| 5,052,255 A | 10/1991 | Gaines |
| 5,074,047 A | 12/1991 | King |
| 5,081,406 A | 1/1992 | Hughes et al. |
| 5,082,316 A | 1/1992 | Wardlaw |
| 5,083,973 A | 1/1992 | Townsend |
| 5,086,890 A | 2/1992 | Turczyn et al. |
| 5,094,000 A | 3/1992 | Becht et al. |
| 5,116,249 A | 5/1992 | Shiotani et al. |
| 5,119,555 A | 6/1992 | Johnson |
| 5,122,091 A | 6/1992 | Townsend |
| 5,146,714 A | 9/1992 | Lüber |
| 5,174,349 A | 12/1992 | Svetlik et al. |
| 5,184,534 A | 2/1993 | Lee |
| 5,198,702 A | 3/1993 | McCullough et al. |
| 5,199,343 A | 4/1993 | OBanion |
| 5,201,110 A | 4/1993 | Bane |
| 5,201,684 A | 4/1993 | DeBois, III |
| 5,202,616 A * | 4/1993 | Peters et al. ............ 318/254 |
| 5,206,625 A | 4/1993 | Davis |
| 5,207,253 A | 5/1993 | Hoshino et al. |
| 5,212,621 A | 5/1993 | Panter |
| 5,218,189 A | 6/1993 | Hutchison |
| 5,231,359 A | 7/1993 | Masuda et al. |
| 5,231,906 A | 8/1993 | Kogej |
| 5,239,978 A | 8/1993 | Plangetis |
| 5,245,879 A | 9/1993 | McKeon |
| 5,257,570 A | 11/1993 | Shiotani et al. |
| 5,265,510 A | 11/1993 | Hoyer-Ellefsen |
| 5,272,946 A | 12/1993 | McCullough et al. |
| 5,276,431 A | 1/1994 | Piccoli et al. |
| 5,285,708 A | 2/1994 | Bosten et al. |
| 5,293,802 A | 3/1994 | Shiontani et al. |
| 5,320,382 A | 6/1994 | Goldstein et al. |
| 5,321,230 A | 6/1994 | Shanklin et al. |
| 5,331,875 A | 7/1994 | Mayfield |
| 5,353,670 A | 10/1994 | Metzger, Jr. |
| 5,357,179 A * | 10/1994 | Abbagnaro et al. ............ 318/17 |
| 5,377,554 A | 1/1995 | Reulein et al. |
| 5,377,571 A | 1/1995 | Josephs |
| 5,392,568 A | 2/1995 | Howard, Jr. et al. |
| 5,392,678 A | 2/1995 | Sasaki et al. |
| 5,401,928 A | 3/1995 | Kelley |
| 5,411,221 A | 5/1995 | Collins et al. |
| 5,423,232 A | 6/1995 | Miller et al. |
| 5,436,613 A | 7/1995 | Ghosh et al. |
| 5,447,085 A | 9/1995 | Gochnauer |
| 5,451,750 A | 9/1995 | An |
| 5,453,903 A | 9/1995 | Chow |
| 5,471,888 A | 12/1995 | McCormick |
| 5,480,009 A | 1/1996 | Wieland et al. |
| 5,481,167 A * | 1/1996 | Rohrbaugh et al. ......... 318/254 |
| 5,503,059 A | 4/1996 | Pacholok |
| 5,510,587 A | 4/1996 | Reiter |
| 5,510,685 A | 4/1996 | Grasselli |
| 5,513,548 A | 5/1996 | Garuglieri |
| 5,531,147 A | 7/1996 | Serban |
| 5,534,836 A | 7/1996 | Schenkel et al. |
| 5,572,916 A | 11/1996 | Takano |
| 5,587,618 A | 12/1996 | Hathaway |
| 5,592,353 A | 1/1997 | Shinohara et al. |
| 5,606,889 A | 3/1997 | Bielinski et al. |
| 5,619,896 A | 4/1997 | Chen |
| 5,623,860 A | 4/1997 | Schoene et al. |
| 5,647,258 A | 7/1997 | Brazell et al. |
| 5,648,644 A | 7/1997 | Nagel |
| 5,659,454 A | 8/1997 | Vermesse |
| 5,667,152 A * | 9/1997 | Mooring .................... 241/37.5 |
| 5,671,633 A | 9/1997 | Wagner |
| 5,695,306 A | 12/1997 | Nygren, Jr. |
| 5,700,165 A | 12/1997 | Harris et al. |
| 5,720,213 A | 2/1998 | Sberveglieri |
| 5,722,308 A | 3/1998 | Ceroll et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,771,742 A | 6/1998 | Bokaie et al. |
| 5,782,001 A | 7/1998 | Gray |
| 5,787,779 A | 8/1998 | Garuglieri |
| 5,789,885 A * | 8/1998 | Seel ......................... 318/375 |
| 5,791,057 A | 8/1998 | Nakamura et al. |
| 5,791,223 A | 8/1998 | Lanzer |
| 5,791,224 A | 8/1998 | Suzuki et al. |
| 5,791,441 A | 8/1998 | Matos et al. |
| 5,797,307 A | 8/1998 | Horton |
| 5,819,619 A | 10/1998 | Miller et al. |
| 5,819,625 A | 10/1998 | Sberveglieri |
| 5,828,195 A * | 10/1998 | Zalesski ..................... 318/366 |
| 5,852,951 A | 12/1998 | Santi |
| 5,857,507 A | 1/1999 | Puzio et al. |
| 5,861,809 A | 1/1999 | Eckstein et al. |
| 5,875,698 A | 3/1999 | Ceroll et al. |
| 5,880,954 A | 3/1999 | Thomson et al. |
| 5,921,367 A | 7/1999 | Kashioka et al. |
| 5,927,857 A | 7/1999 | Ceroll et al. |
| 5,930,096 A | 7/1999 | Kim |
| 5,937,720 A | 8/1999 | Itzov |

| | | | | | | |
|---|---|---|---|---|---|---|
| 5,942,975 | A | 8/1999 | Sorensen | 6,647,847 B2 | 11/2003 | Hewitt et al. |
| 5,943,932 | A | 8/1999 | Sberveglieri | 6,659,233 B2 | 12/2003 | DeVlieg |
| 5,950,514 | A | 9/1999 | Benedict et al. | 6,684,750 B2 | 2/2004 | Yu |
| 5,963,173 | A | 10/1999 | Lian et al. | 6,722,242 B2 | 4/2004 | Chuang |
| 5,974,927 | A | 11/1999 | Tsune | 6,734,581 B1 | 5/2004 | Griffis |
| 5,989,116 | A | 11/1999 | Johnson et al. | 6,736,042 B2 | 5/2004 | Behne et al. |
| 6,009,782 | A | 1/2000 | Tajima et al. | 6,742,430 B2 | 6/2004 | Chen |
| 6,018,284 | A | 1/2000 | Rival et al. | 6,796,208 B1 | 9/2004 | Jorgensen |
| 6,037,729 | A | 3/2000 | Woods et al. | 6,800,819 B2 | 10/2004 | Sato et al. |
| D422,290 | S | 4/2000 | Welsh et al. | 6,826,988 B2 | 12/2004 | Gass et al. |
| 6,052,884 | A | 4/2000 | Steckler et al. | 6,826,992 B1 | 12/2004 | Huang |
| 6,062,121 | A | 5/2000 | Ceroll et al. | 6,840,144 B2 | 1/2005 | Huang |
| 6,070,484 | A | 6/2000 | Sakamaki | 6,854,371 B2 | 2/2005 | Yu |
| 6,095,092 | A | 8/2000 | Chou | 6,857,345 B2 | 2/2005 | Gass et al. |
| 6,112,785 | A | 9/2000 | Yu | 6,874,397 B2 | 4/2005 | Chang |
| 6,119,984 | A | 9/2000 | Devine | 6,874,399 B2 | 4/2005 | Lee |
| 6,131,629 | A | 10/2000 | Puzio et al. | 6,877,410 B2 | 4/2005 | Gass et al. |
| 6,133,818 | A | 10/2000 | Shieh et al. | 6,880,440 B2 | 4/2005 | Gass et al. |
| 6,141,192 | A | 10/2000 | Garzon | 6,883,397 B2 | 4/2005 | Kimizuka |
| 6,148,504 | A | 11/2000 | Schmidt et al. | 6,889,585 B1 | 5/2005 | Harris et al. |
| 6,148,703 | A | 11/2000 | Ceroll et al. | 6,920,814 B2 | 7/2005 | Gass et al. |
| 6,150,826 | A | 11/2000 | Hokodate et al. | 6,922,153 B2 | 7/2005 | Pierga et al. |
| 6,161,459 | A | 12/2000 | Ceroll et al. | 6,945,148 B2 | 9/2005 | Gass et al. |
| 6,170,370 | B1 | 1/2001 | Sommerville | 6,945,149 B2 | 9/2005 | Gass et al. |
| 6,236,177 | B1* | 5/2001 | Zick et al. ............ 318/362 | 6,957,601 B2 | 10/2005 | Gass et al. |
| 6,244,149 | B1 | 6/2001 | Ceroll et al. | 6,968,767 B2 | 11/2005 | Yu |
| 6,250,190 | B1 | 6/2001 | Ceroll et al. | 6,986,370 B1 | 1/2006 | Schoene et al. |
| 6,257,061 | B1 | 7/2001 | Nonoyama et al. | 6,994,004 B2 | 2/2006 | Gass et al. |
| 6,283,002 | B1 | 9/2001 | Chiang | 6,997,090 B2 | 2/2006 | Gass et al. |
| 6,295,910 | B1 | 10/2001 | Childs et al. | 7,000,514 B2 | 2/2006 | Gass et al. |
| 6,312,028 | B1 | 11/2001 | Wilkosz | 7,024,975 B2 | 4/2006 | Gass et al. |
| 6,325,195 | B1 | 12/2001 | Doherty | 7,055,417 B1 | 6/2006 | Gass et al. |
| 6,330,848 | B1 | 12/2001 | Nishio et al. | 7,077,039 B2 | 7/2006 | Gass et al. |
| 6,336,273 | B1 | 1/2002 | Nilsson et al. | 7,098,800 B2 | 8/2006 | Gass |
| 6,352,137 | B1 | 3/2002 | Stegall et al. | 7,100,483 B2 | 9/2006 | Gass et al. |
| 6,357,328 | B1 | 3/2002 | Ceroll et al. | 2001/0048278 A1* | 12/2001 | Young et al. ............ 318/254 |
| 6,361,092 | B1 | 3/2002 | Eagle et al. | 2002/0017175 A1 | 2/2002 | Gass et al. |
| 6,366,099 | B1 | 4/2002 | Reddi | 2002/0017176 A1 | 2/2002 | Gass et al. |
| 6,376,939 | B1 | 4/2002 | Suzuki et al. | 2002/0017178 A1 | 2/2002 | Gass et al. |
| 6,404,098 | B1 | 6/2002 | Kayama et al. | 2002/0017179 A1 | 2/2002 | Gass et al. |
| 6,405,624 | B2 | 6/2002 | Sutton | 2002/0017180 A1 | 2/2002 | Gass et al. |
| 6,418,829 | B1* | 7/2002 | Pilchowski ............ 83/397 | 2002/0017181 A1 | 2/2002 | Gass et al. |
| 6,420,814 | B1 | 7/2002 | Bobbio | 2002/0017182 A1 | 2/2002 | Gass et al. |
| 6,427,570 | B1 | 8/2002 | Miller et al. | 2002/0017184 A1 | 2/2002 | Gass et al. |
| 6,430,007 | B1 | 8/2002 | Jabbari | 2002/0017336 A1 | 2/2002 | Gass et al. |
| 6,431,425 | B1 | 8/2002 | Moorman et al. | 2002/0020261 A1 | 2/2002 | Gass et al. |
| 6,450,077 | B1 | 9/2002 | Ceroll et al. | 2002/0020262 A1 | 2/2002 | Gass et al. |
| 6,453,786 | B1 | 9/2002 | Ceroll et al. | 2002/0020263 A1 | 2/2002 | Gass et al. |
| 6,460,442 | B2 | 10/2002 | Talesky et al. | 2002/0020271 A1 | 2/2002 | Gass et al. |
| 6,471,106 | B1 | 10/2002 | Reining | 2002/0043776 A1 | 4/2002 | Chuang |
| 6,479,958 | B1 | 11/2002 | Thompson et al. | 2002/0050201 A1 | 5/2002 | Lane et al. |
| 6,484,614 | B1 | 11/2002 | Huang | 2002/0056349 A1 | 5/2002 | Gass et al. |
| D466,913 | S | 12/2002 | Ceroll et al. | 2002/0059853 A1 | 5/2002 | Gass et al. |
| 6,492,802 | B1 | 12/2002 | Bielski | 2002/0059854 A1 | 5/2002 | Gass et al. |
| D469,354 | S | 1/2003 | Curtsinger | 2002/0069734 A1 | 6/2002 | Gass et al. |
| 6,502,493 | B1 | 1/2003 | Eccardt et al. | 2002/0088325 A1 | 7/2002 | Talesky et al. |
| 6,536,536 | B1 | 3/2003 | Gass et al. | 2002/0096030 A1 | 7/2002 | Wang |
| 6,543,324 | B2 | 4/2003 | Dils | 2002/0096591 A1 | 7/2002 | Tanji |
| 6,546,835 | B2 | 4/2003 | Wang | 2002/0109036 A1 | 8/2002 | Denen et al. |
| 6,564,909 | B1 | 5/2003 | Razzano | 2002/0134212 A1 | 9/2002 | Ceroll et al. |
| 6,575,067 | B2 | 6/2003 | Parks et al. | 2002/0170399 A1 | 11/2002 | Gass et al. |
| 6,578,460 | B2 | 6/2003 | Sartori | 2002/0170400 A1 | 11/2002 | Gass |
| 6,578,856 | B2 | 6/2003 | Kahle | 2002/0174755 A1 | 11/2002 | Behne et al. |
| 6,581,655 | B2 | 6/2003 | Huang | 2002/0190581 A1 | 12/2002 | Gass et al. |
| 6,595,096 | B2 | 7/2003 | Ceroll et al. | 2003/0000359 A1 | 1/2003 | Eccardt et al. |
| D478,917 | S | 8/2003 | Ceroll et al. | 2003/0002942 A1 | 1/2003 | Gass et al. |
| 6,601,493 | B1 | 8/2003 | Crofutt | 2003/0005588 A1 | 1/2003 | Gass et al. |
| 6,607,015 | B1 | 8/2003 | Chen | 2003/0015253 A1 | 1/2003 | Gass et al. |
| D479,538 | S | 9/2003 | Welsh et al. | 2003/0037651 A1 | 2/2003 | Gass et al. |
| 6,617,720 | B1 | 9/2003 | Egan, III et al. | 2003/0037655 A1 | 2/2003 | Chin-Chin |
| 6,619,348 | B2 | 9/2003 | Wang | 2003/0056853 A1 | 3/2003 | Gass et al. |
| 6,640,683 | B2 | 11/2003 | Lee | 2003/0058121 A1 | 3/2003 | Gass et al. |
| 6,644,157 | B2 | 11/2003 | Huang | 2003/0074873 A1 | 4/2003 | Freiberg et al. |

| | | | |
|---|---|---|---|
| 2003/0089212 | A1 | 5/2003 | Parks et al. |
| 2003/0090224 | A1 | 5/2003 | Gass et al. |
| 2003/0101857 | A1 | 6/2003 | Chuang |
| 2003/0109798 | A1 | 6/2003 | Kermani |
| 2003/0131703 | A1 | 7/2003 | Gass et al. |
| 2003/0140749 | A1 | 7/2003 | Gass et al. |
| 2003/0213349 | A1 | 11/2003 | Chang |
| 2004/0011177 | A1 | 1/2004 | Huang |
| 2004/0040426 | A1 | 3/2004 | Gass et al. |
| 2004/0060404 | A1 | 4/2004 | Metzger, Jr. |
| 2004/0104085 | A1 | 6/2004 | Lang et al. |
| 2004/0159198 | A1 | 8/2004 | Peot et al. |
| 2004/0194594 | A1 | 10/2004 | Dils et al. |
| 2004/0200329 | A1 | 10/2004 | Sako |
| 2004/0226424 | A1 | 11/2004 | O'Banion et al. |
| 2004/0226800 | A1 | 11/2004 | Pierga et al. |
| 2004/0255745 | A1 | 12/2004 | Peot et al. |
| 2005/0057206 | A1 | 3/2005 | Uneyama |
| 2005/0066784 | A1 | 3/2005 | Gass |
| 2005/0092149 | A1 | 5/2005 | Hartmann |
| 2005/0139051 | A1 | 6/2005 | Gass et al. |
| 2005/0139056 | A1 | 6/2005 | Gass et al. |
| 2005/0139057 | A1 | 6/2005 | Gass et al. |
| 2005/0139058 | A1 | 6/2005 | Gass et al. |
| 2005/0139459 | A1 | 6/2005 | Gass et al. |
| 2005/0155473 | A1 | 7/2005 | Gass |
| 2005/0166736 | A1 | 8/2005 | Gass et al. |
| 2005/0178259 | A1 | 8/2005 | Gass et al. |
| 2005/0204885 | A1 | 9/2005 | Gass et al. |
| 2005/0211034 | A1 | 9/2005 | Sasaki et al. |
| 2005/0235793 | A1 | 10/2005 | O'Banion et al. |
| 2005/0274432 | A1 | 12/2005 | Gass et al. |
| 2006/0000337 | A1 | 1/2006 | Gass |
| 2006/0032352 | A1 | 2/2006 | Gass et al. |
| 2006/0123960 | A1 | 6/2006 | Gass et al. |
| 2006/0123964 | A1 | 6/2006 | Gass et al. |
| 2006/0179983 | A1 | 8/2006 | Gass et al. |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Erin F. Eppard, date unknown, no date.
Laguna Tools table saw owner's manual, date unknown, no date.

* cited by examiner

MOTION DETECTING SYSTEM FOR USE IN A SAFETY SYSTEM FOR POWER EQUIPMENT

CROSS-REFERENCE TO RELATED APPLICATION

This application is a continuation of U.S. patent application Ser. No. 10/923,282, filed Aug. 20, 2004, now abandoned which claims the benefit of and priority from U.S. Provisional Patent Application Ser. No. 60/496,568, filed Aug. 20, 2003.

This application is also a continuation of U.S. patent application Ser. No. 09/929,234, filed Aug. 13, 2001, now U.S. Pat. No. 7,225,712 which claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

All of the above applications are hereby incorporated by reference in their entirety for all purposes.

FIELD

The present invention relates to safety systems for power equipment, and more particularly, to motion detecting systems for use in safety systems for woodworking equipment and other power equipment.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of the equipment, such as blades, belts, or shafts. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of a machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

The present document discloses safety systems for use on power equipment. The disclosed safety systems include a replaceable brake cartridge adapted to engage a blade or other cutting tool to protect the user against serious injury if a dangerous, or triggering, condition occurs.

It is often necessary for an equipment operator to touch the blade or other cutting device of power equipment when the blade or device is not moving (e.g., to adjust the blade, perform equipment maintenance, etc.). Thus, it would be desirable to disable the safety system when the blade is not moving since there is no danger to the user from contact with the blade.

DETAILED DESCRIPTION

Figure 1:
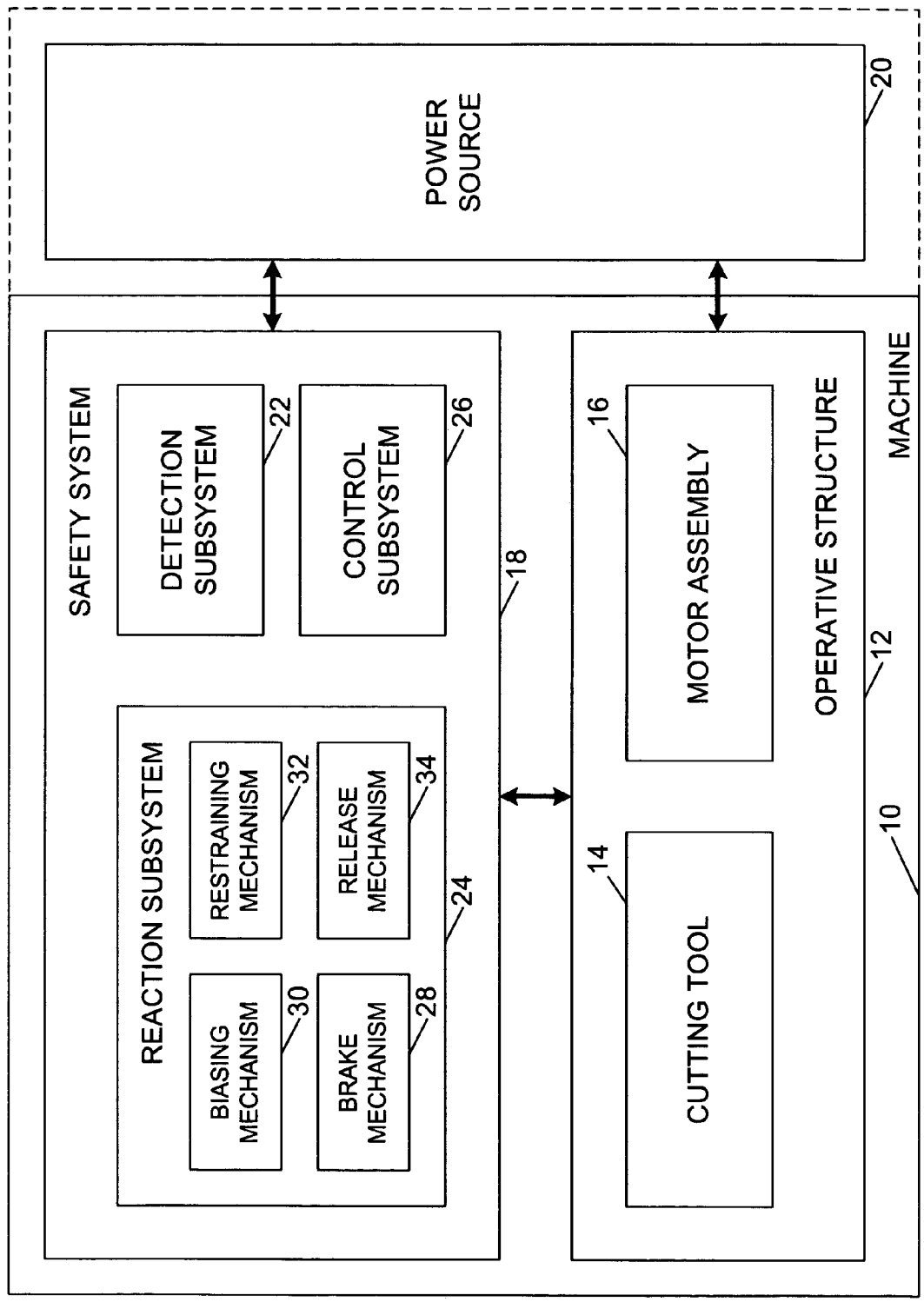
FIG. 1 is a schematic block diagram of a machine with a fast-acting safety system.

A machine incorporating a safety system is shown schematically in FIG. 1 and indicated generally at 10. Machine 10 may be any of a variety of different machines adapted for cutting workpieces, such as wood or plastic, including a table saw, miter saw or chop saw, radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. Cutting tool 14 typically includes one or more blades or other suitable cutting implements that are adapted to cut or remove portions from the workpieces. For example, in table saws, miter saws, circular saws and radial arm saws, cutting tool 14 will typically include one or more circular rotating blades having a plurality of teeth disposed along the perimeter of the blade. Alternatively, the cutting tool may be a plurality of circular blades, such as a dado blade or dado stack. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
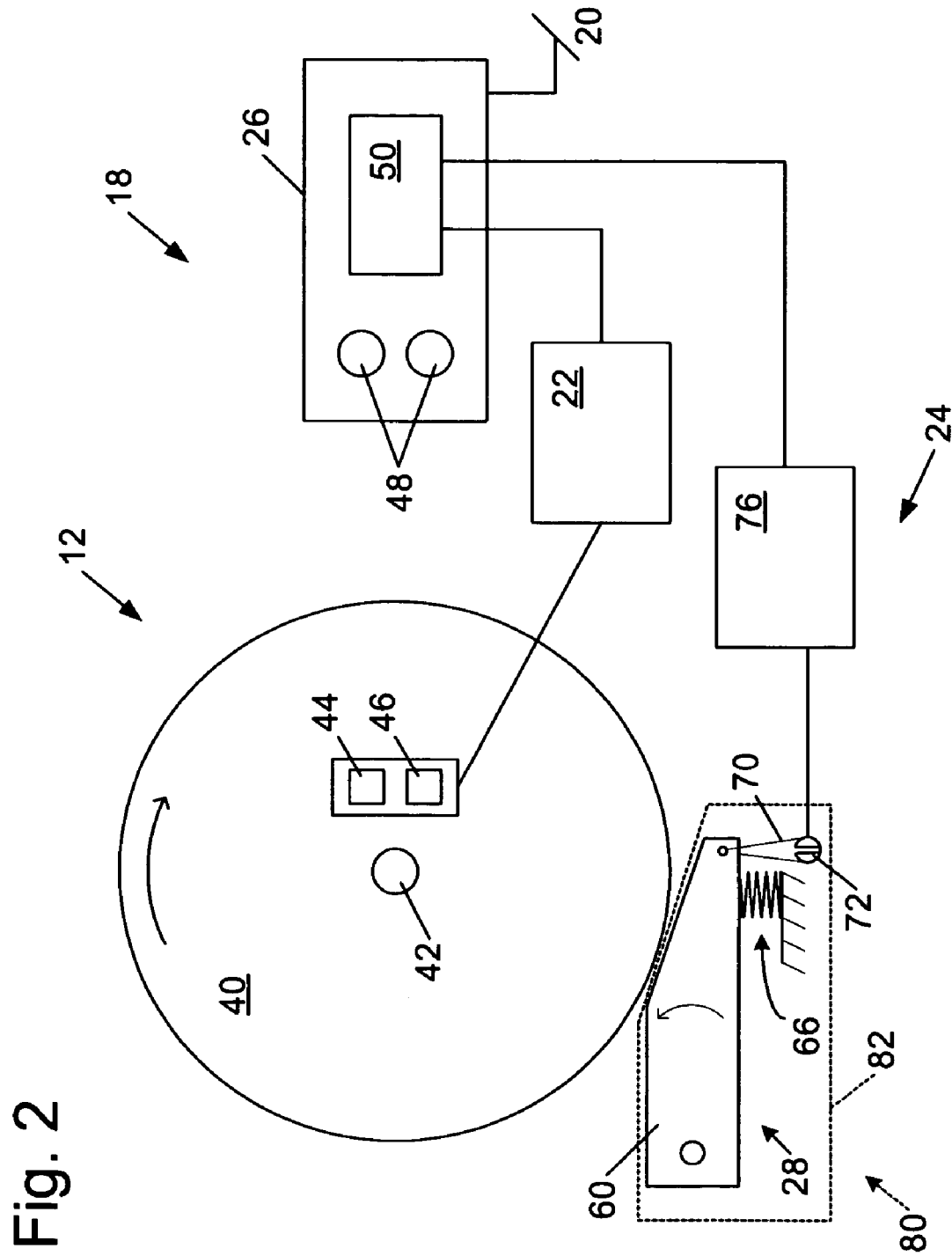
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," filed Aug. 27, 2002 by SD3, LLC, and U.S. Provisional Patent Application Ser. No. 60/496,550, entitled "Table Saws with Safety Systems and Blade Retraction," filed Aug. 20, 2003 by SD3, LLC, the disclosures of which are all herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. Patent Application Publication No. 2003/0090224 A1, entitled "Detection System for Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," and U.S. Patent Application Publication No. 2003/0058121 A1, entitled "Logic Control With Test Mode for Fast-Acting Safety System," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,574, entitled "Brake Cartridges for Power Equipment," filed Aug. 20, 2003 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

In the machines and systems described above, it is often desirable to be able to determine if a blade or other dangerous part of a machine has stopped rotation. This information can be used to disable the detection and/or reaction subsystems once the danger has passed.

Figure 3:
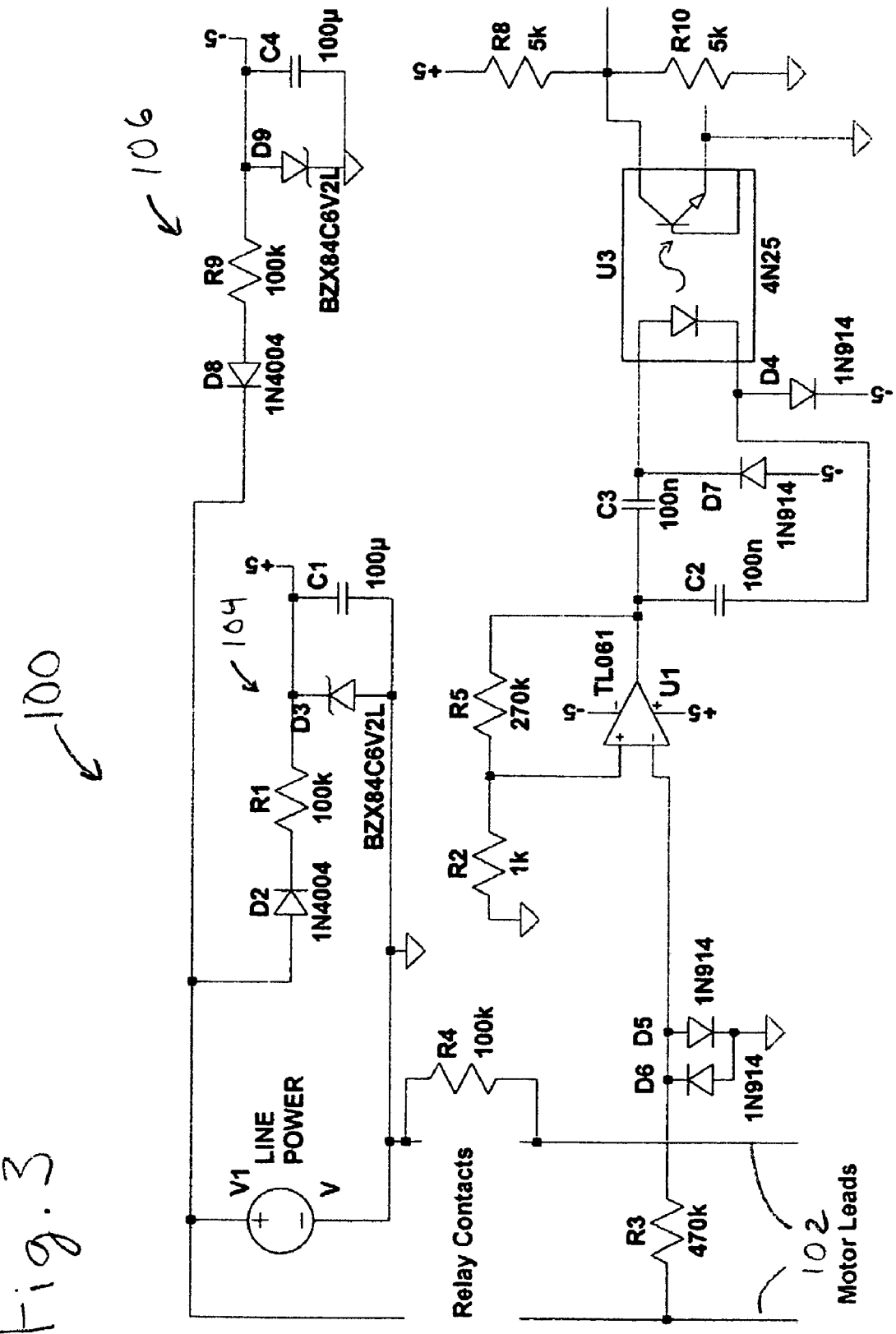
FIG. 3 shows an electrical circuit that can be used to determine whether motion in a machine has stopped.

FIG. 3 shows an electrical circuit 100 that can be used to determine whether motion in a machine has stopped by monitoring the back emf (electromagnetic field) produced on the motor leads as the motor coasts to a stop. In particular, motor leads 102 connect to a motor (not shown). When the motor is coasting down after power has been removed from the motor, the motor armature will retain a residual magnetic polarization, which will induce an oscillating emf in the motor windings and in the motor leads connected to the windings. This is true for both single and three phase motors. The voltage of the back emf will change sign each 180 degrees of rotation of the armature. Circuit 100 generates a pulse every time the sign of voltage on the motor leads changes as described below. This pulse can be used by a microcontroller or other supervisory circuitry (not shown) to determine when the motor has stopped rotating, and by inference when motion in the machine has ceased.

Circuit 100 includes positive and negative power supplies 104, 106, respectively. The supplies are not isolated from the line voltage. The output amplitude of each supply is about 5-6 volts, as determined by the voltage on Zener diodes D3/D9. Capacitors C1/C4 serve to smooth the voltage output during low points in the line voltage.

The negative input of an op-amp U1 is connected to one of the motor leads 102 through resistor R3. Diodes D5 and D6 clip the voltage passing through R3 to plus or minus one diode drop (about 0.6V) of circuit ground—which is just one of the two power lines. The second motor lead is tied to ground through resistor R4, even when the relay contacts or other switching device controlling power to the motor is open. The positive input of op-amp U1 is tied to ground through resistor R2. This maintains the positive input at close to ground, as shifted slightly by feedback resistor R5. When the output of the op-amp is high, the feedback resistor will pull the positive input slightly higher than ground as determined by the resistance ratio of R5/R2. Similarly, when the output of the op-amp is low, the feedback resistor pulls the positive input to slightly less than ground. This arrangement provides an amount of hysteresis on the voltage level at which the negative input will cause the output to change signs. This hysteresis is useful to prevent the output of the op-amp from oscillating when the negative input nears the transition. It also reduces the sensitivity of the zero-cross detection to noise on the motor leads.

As a result of the above described arrangement, each time the back emf on the motor leads changes sign by more than the hysteresis voltage—typically 10-100 mV—the output of the op-amp will change state. The arrangement of capacitors C3, C2, diodes D7 and D4 and optocoupler U3 causes a pulse of current to flow through the LED in optocoupler U3. The pulse of current in turn generates a pulse on the output transistor of optocoupler U3, which pulls down the voltage at the node between resistors R8 and R10. These brief pulses form the output of the above-described zero-cross detection circuit that would typically be fed to some type of supervisory circuit.

When power to the motor is first disconnected, the motor is rotating at essentially full speed so that the pulses emanating from the R8/R10 output are occurring at a rate equal to twice the nominal rotation rate of the motor. As the motor coasts down, the back emf voltage decays in amplitude and frequency and the corresponding pulses at R8/R10 decrease in frequency, although the amplitude and duration of each pulse remains constant. At some point the speed of rotation reaches a low enough rate that the back emf is no longer enough to overcome the hysteresis. This typically happens at a rotation rate of around 0.2 to 5 rotations per second. Generally when the motor reaches this speed, it will not complete more than one or two more rotations. If desired, a delay period may be incorporated in the supervisory circuit to wait a predetermined interval after no more pulses are seen to deactivate the detection and or reaction systems.

The circuit described above and shown in FIG. 3 may be used to detect the motion of a blade or other dangerous part of a machine. Additional information concerning motion-detecting systems is disclosed in U.S. Patent Application Publication No. US 2002/0017178 A1, entitled "Motion Detecting System for Use in a Safety System for Power Equipment," identified above and incorporated herein by reference.

INDUSTRIAL APPLICABILITY

The systems, components and circuits disclosed herein are applicable to power equipment, and specifically to woodworking equipment such as saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/ or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a cutter;
   a motor adapted to drive the cutter;
   a detection system adapted to detect a dangerous condition between a user and the cutter;
   a reaction system adapted to perform a specified action to mitigate the dangerous condition upon detection of the dangerous condition by the detection system; and
   a control system adapted to detect back emf produced by the motor as the motor coasts down after power has been removed from the motor, and where the control system is further adapted to permit the reaction system to perform the specified action during coast down of the motor only if back emf is detected.

2. The woodworking machine of claim 1, where the motor has leads and where the control system is connected to the leads.

3. The woodworking machine of claim 1, where the control system is adapted to employ zero-cross detection to detect back emf.

4. The woodworking machine of claim 1, where the control system includes circuitry to detect zero crossings of back emf.

5. The woodworking machine of claim 1, where the control system includes circuitry to detect when the back emf from the motor changes signs.

6. The woodworking machine of claim 5, where the control system is adapted to detect when the back emf from the motor changes signs by at least 10 mV.

7. The woodworking machine of claim 5, where the control system is adapted to detect when the back emf from the motor changes signs by 10 mV to 100 mV.

8. A woodworking machine comprising:
   a cutter;
   a motor adapted to drive the cutter;
   a detection system adapted to detect a dangerous condition between a user and the cutter;
   a reaction system adapted to perform a specified action to mitigate the dangerous condition upon detection of the dangerous condition by the detection system; and
   a control system adapted to determine whether the cutter is moving by detecting back emf produced by the motor as the motor coasts down after power has been removed from the motor, and further adapted to deactivate the detection and/or reaction system if the cutter is not moving.

9. The woodworking machine of claim 8, where the control system includes circuitry to detect back emf.

10. The woodworking machine of claim 9, where the circuitry is configured to detect zero crossings of back emf.

11. The woodworking machine of claim 9, where the circuitry provides an amount of hysteresis.

12. The woodworking machine of claim 11, where the control system determines the cutter is not moving when the back emf is insufficient to overcome the hysteresis.

13. The woodworking machine of claim 8, where the cutter is a circular blade and where the control system is adapted to determine that the cutter is not moving when the cutter has coasted down to a rate of around 0.2 to 5 rotations per minute.

14. The woodworking machine of claim 8, where a delay period is incorporated into the control system to cause the control system to wait a predetermined interval after no more back emf is detected to deactivate the detection and/or reaction systems.

15. A woodworking machine comprising:
   a cutter;
   a motor adapted to drive the cutter;
   a detection system adapted to detect a dangerous condition between a user and the cutter;
   a reaction system adapted to perform a specified action to mitigate the dangerous condition upon detection of the dangerous condition by the detection system; and
   control means for detecting back emf produced by the motor as the motor coasts down after power has been removed from the motor, and for triggering the reaction system only if a dangerous condition is detected when a predetermined level of back emf is also detected.

16. The woodworking machine of claim 15, where the machine is a table saw.

17. The woodworking machine of claim 15, where the cutter is a circular blade.

18. The woodworking machine of claim 15, where the control means includes circuit means for detecting zero crossings of back emf.

19. The woodworking machine of claim 15, where the control means includes circuit means for detecting sign changes of back emf.

* * * * *

UNITED STATES PATENT AND TRADEMARK OFFICE
CERTIFICATE OF CORRECTION

| | |
|---|---|
| PATENT NO. | : 7,359,174 B2 |
| APPLICATION NO. | : 11/506260 |
| DATED | : April 15, 2008 |
| INVENTOR(S) | : Stephen F. Gass |

Page 1 of 1

It is certified that error appears in the above-identified patent and that said Letters Patent is hereby corrected as shown below:

Column 9, line 24, before "coasts" delete "as the motor".

Signed and Sealed this

Twenty-eighth Day of October, 2008

JON W. DUDAS
*Director of the United States Patent and Trademark Office*